Sept. 20, 1966    C. E. NIXON    3,274,037
METHODS AND APPARATUS FOR INSULATING CONDUCTORS
Filed Aug. 13, 1963    3 Sheets-Sheet 2
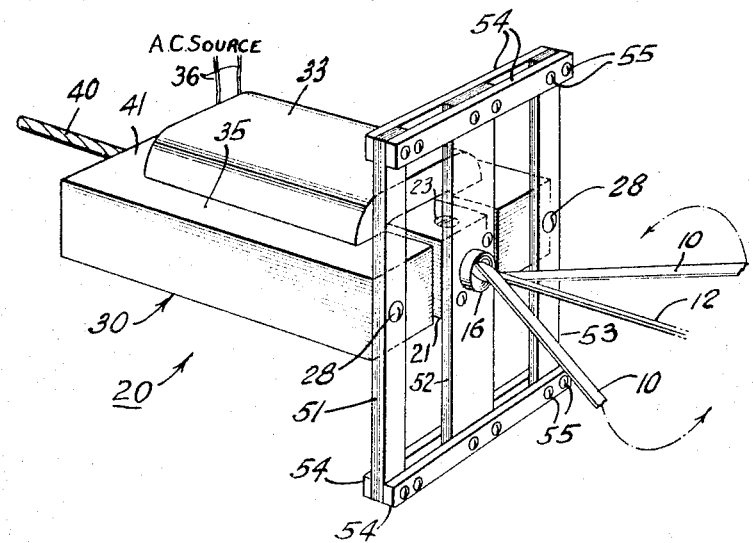
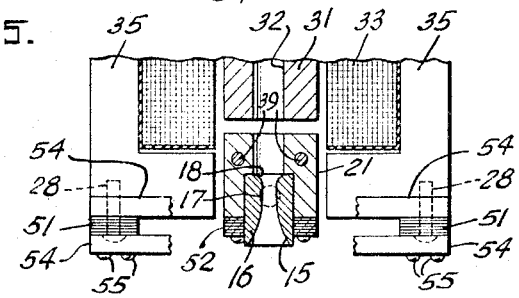
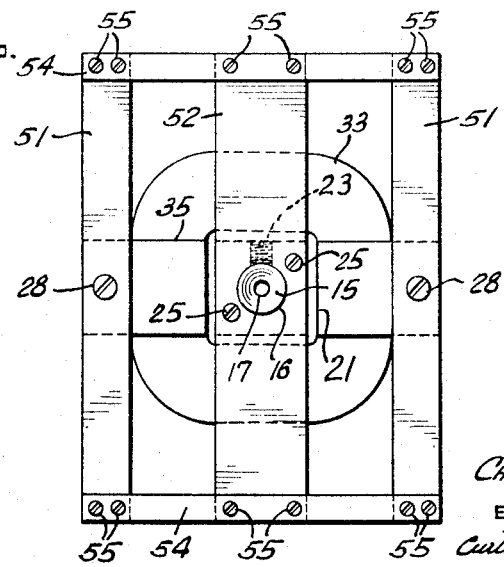
INVENTOR
CHARLES E. NIXON

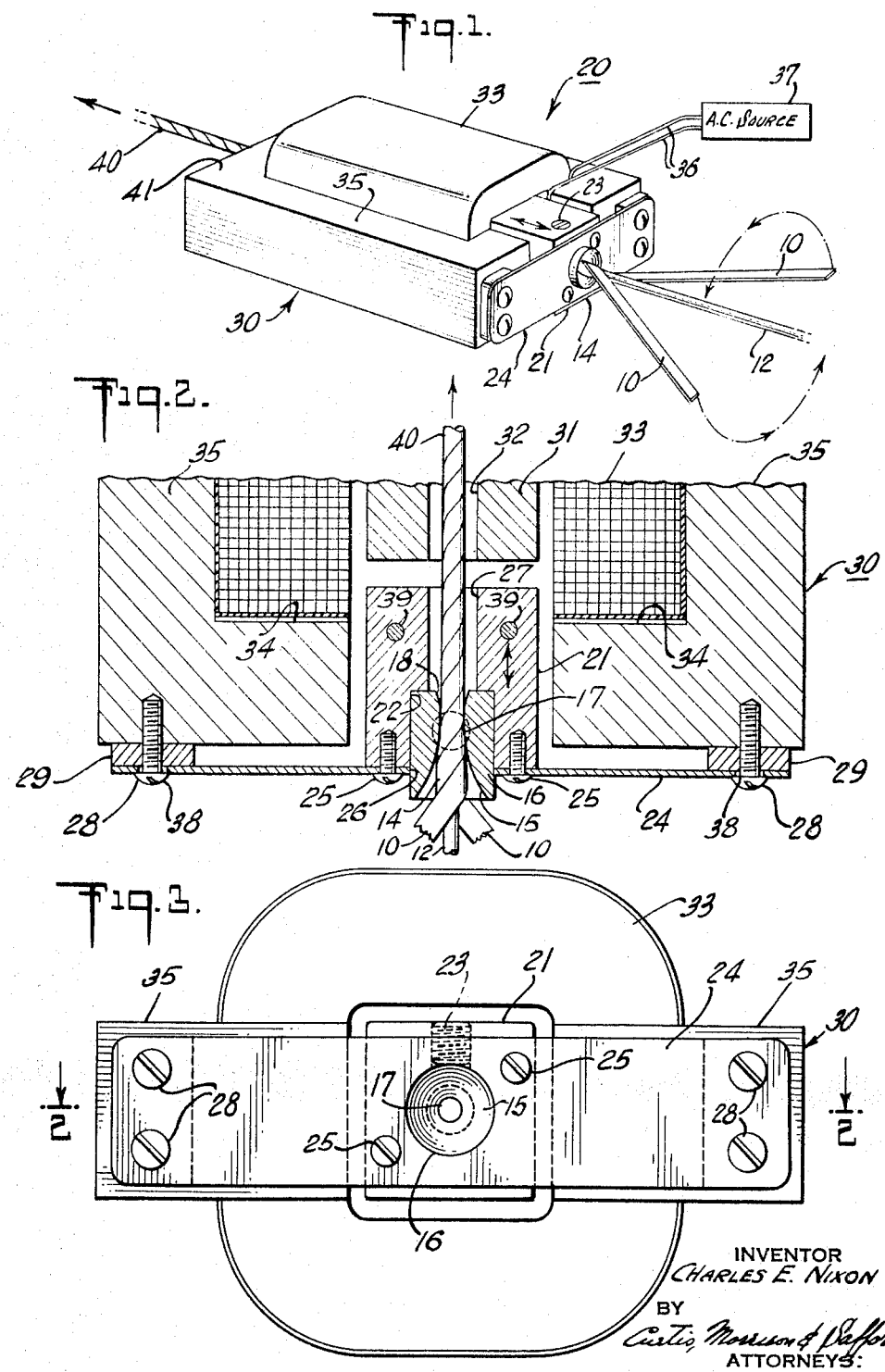

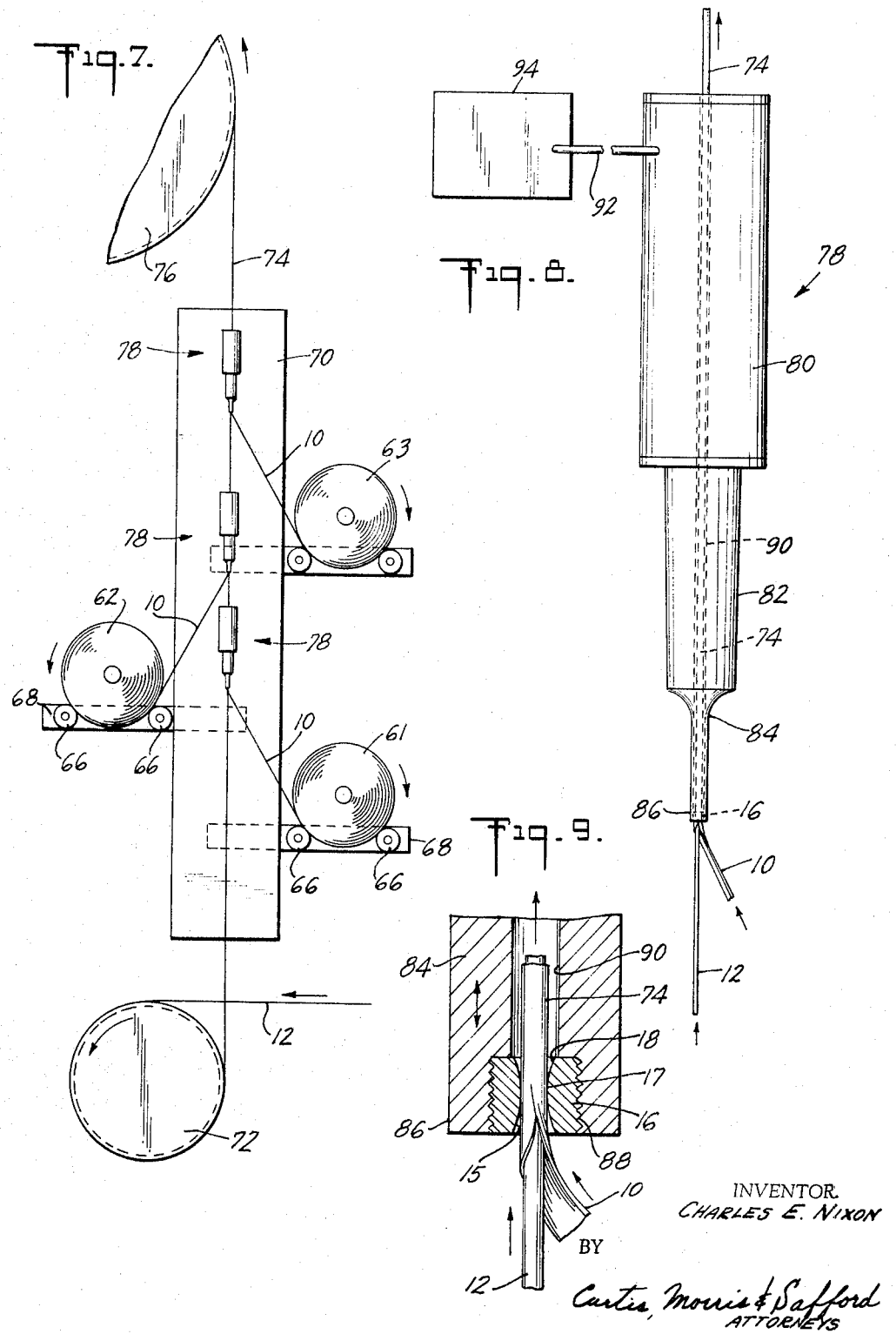

United States Patent Office 3,274,037
Patented Sept. 20, 1966

3,274,037
METHODS AND APPARATUS FOR
INSULATING CONDUCTORS
Charles E. Nixon, Sayville, N.Y., assignor to Inso Electronic Products, Inc., Nutley, N.J., a corporation of Delaware
Filed Aug. 13, 1963, Ser. No. 301,774
17 Claims. (Cl. 156—52)

This application is a continuation-in-part of my prior copending application Serial No. 768,885 filed on October 22, 1958, now abandoned.

This invention relates to method and apparatus for insulating conductors and more particularly for treating one or more layers of plastic insulation covering on electrical conductors so as to improve the insulation qualities.

In accordance with the method of the present invention an electrical conductor surrounded by a covering of insulation material is treated for purposes of improving the insulation qualities by the steps of moving the conductor and its covering of insulation material through a converging surface. This converging surface exerts a squeezing, compacting action on the insulation material, and at the same time the converging surface is oscillated back and forth at a high rate of speed with respect to the insulation material.

The illustrative embodiment of this invention which is described in detail further below includes a die member having an inner converging die surface defining an opening through which extends the conductor and its insulation covering. This converging surface exerts a compacting action on the insulation covering. Oscillating drive means move the die member back and forth at a fast rate while the conductor and its insulation covering pass through the opening of the die member.

In the production of many types of electrical equipment there are requirements for insulated wire having an insulation covering of high performance characteristics. Electrical equipment, such as motors, control and measuring circuits, and communication apparatus is being made more compact and efficient. Its speed of operation and the amount of power being handled and controlled are being increased. As a result, the electrical conductors are crowded together and operating temperatures in many cases are being raised. In order to conserve space and save weight the thickness of the insulation covering on electrical conductors is being reduced as much as possible but the insulation is intended to withstand higher voltage stresses than heretofore. In many of these applications plastic insulation material is being used instead of fabric or spirally wrapped threads. The purpose of this plastic insulation material is to form a continuous covering around the electrical conductor in the form of an impervious homogeneous sheath so as to withstand high voltage stresses by means of relatively thin plastic coverings and to be capable of operation at elevated temperatures.

Serious problems and limitations have occurred in the prior art in attempting to make thin plastic insulation coverings on conductors resulting from the appearance of weak spots occurring at random in the insulation on lengths of insulated wire. It appears to me that these prior weak spots are caused by minute voids or discontinuities in the insulation sheath. These spots break down electrically soon after the test voltage is applied and an electric arc jumps through. Moreover, such prior insulation coverings are seriously weakened and often break down electrically after being sharply bent or twisted tightly around a companion wire. As a consequence, I have found, that prior plastic insulation coverings are usually more than 0.010 of an inch (10 mils) thick when intended to withstand a voltage stress of 1,000 volts or more of alternating voltage.

Among the many advantages of the method and apparatus of the present invention are those resulting from the fact that they improve the uniformity of plastic insulation coverings so as to avoid such weak spots. As a result the insulation strength is increased above that obtainable for the same insulation by methods and apparatus prior to this invention. In many cases this invention enables the thickness of the insulation to be reduced markedly while successfully withstanding the same or even higher voltage stresses. Weak spots in the insulation are removed and the mechanical strength of the insulation covering is improved.

The methods and apparatus of the present invention are particularly advantageous for treating insulation coverings formed by tapes of synthetic resin insulation material in a layer or layers upon an electrical conductor to form the insulation covering. In the preferred embodiment of this invention described herein as an example, the synthetic resin tapes are of unfused polytetrafluoroethylene. For example, an insulation sheath having a thickness of 0.006 of an inch (6 mils) can be formed capable of withstanding 2,200 volts (alternating current) after the wire has been raised to a temperature of 500° F. This conductor with the insulation covering 6 mils thick which has been treated by the method and apparatus of the present invention is capable of meeting military specifications MIL-W-16878C for high temperature insulated electrical wires as now set up for an insulation thickness of 8 to 12 mils. However, so far as I am aware, no one prior to this invention has made an insulation covering less than 10 mils thick which will meet these military specifications.

In this specification and in the accompanying drawings are described and shown method and apparatus for insulating conductors embodying my invention and various modifications thereof are indicated, but it is to be understood that these are given for purposes of illustration in order that others skilled in the art may fully understand this invention and the manner of applying the method and apparatus in treating various insulating coverings so that they may modify and adapt the invention in various forms, each as may be best suited to the conditions of a particular insulated conductor.

The features, objects, aspects and advantages of the present invention will be described in further detail in conjunction with the accompanying drawings in which:

FIGURE 1 is a perspective view illustrating an example of apparatus embodying the present invention wherein the oscillating die member is oscillated by an electromagnetic drive system;

FIGURE 2 is a partial axial sectional view taken along the line 2—2 of FIGURE 3 and shown on the same enlarged scale as FIGURE 3;

FIGURE 3 is an end elevational view of the die member and its associated drive system;

FIGURE 4 is a perspective view illustrating another example of apparatus embodying the present invention and utilizing a modified spring support system for the movable armature;

FIGURE 5 is a partial axial sectional view taken on the line 5—5 of FIGURE 6 and shown on the same enlarged scale as FIGURE 6;

FIGURE 6 is an end elevational view showing further details of this spring support system;

FIGURE 7 is an elevational view of a modified embodiment of the present invention wherein the high rate of die oscillation is at supersonic frequency;

FIGURE 8 is an elevational view of one of the die oscillating apparatus of FIGURE 7 and shown on enlarged scale; and FIGURE 9 is a partial axial sectional view of the die apparatus of FIGURE 8, and shown on further enlarged scale.

As shown in FIGURE 1, the first step in forming and treating insulation coverings of high performance characteristics in accordance with the illustrative example of the present invention is the spiral wrapping of one or more insulation tapes 10, for example, a pair of these tapes are shown, about an electrical conductor 12 so as to form an insulation covering 14. For convenience of illustration this conductor 12 is shown as a solid circular wire, however it will be appreciated that the conductor may have other forms, such as a stranded wire.

The apparatus used initially to apply the insulation covering 14 to the conductor may be of any suitable type. For example, apparatus as shown in my prior copending application Serial No. 453,758, filed September 2, 1954, now issued as Patent No. 2,963,847 can be used to advantage in wrapping insulation tapes about a conductor to form the insulation covering 14.

In order to improve the insulation qualities, so as to increase the dielectric strength and the uniformity of the insulation covering, the conductor together with its covering 14 is fed through a converging surface 15 as shown in FIGURE 2. This converging surface 15 is defined by the bell-mouthed die surface of a die member 16 which is rapidly oscillated back and forth while the conductor and its insulation covering are moving through the die opening. The die member 16 is formed of a hard wear resistant material, for example such as cemented carbide, which can be obtained commercially under the trade name "Carboloy" from General Electric Company. Its die surface 15 converges to an annular bearing region as indicated at 17 which smoothly curves into parallelism with the axis of the conductor. This bearing region closely confines and squeezes insulation covering 14 so as to provide a compacting action on the insulation. Toward the rear face of the die member it is preferable to enlarge the size of the die opening by providing a smoothly enlarging bell mouth 18 to give back relief.

The die member 16 is reciprocated back and forth at a high rate of speed in a direction parallel with the axis of the conductor. To explain the advantageous operation of this reciprocating die member I use the following theory which appears to meet all of the facts which have been observed about this invention. However, I do not wish to be bound by my theory because the advantageous results of the invention are obtained by following this specification, regardless of the explanation of why these very desirable results are obtained.

This theory is that the rapid oscillation of the die member 16 causes a reduction in the frictional drag of the die surface 15 upon the outer surface of the insulation covering 14. The rapid relative movement between the surface 15 and the insulation covering 14 provides a dynamic frictional relationship and avoids any tendency for the insulation to drag or stick in the die. Thus, the higher static frictional forces are advantageously avoided. As a result, any tendency to smudge or tear at the outer surface of the insulation material so as to open up voids in the insulation covering is removed. The die surface 15 as it converges into the bearing region 17 is enabled to exert a smooth effective squeezing compacting action on the insulation covering so as to close up on minute voids which may have existed therein. The insulation covering is compacted firmly down onto the conductor and a smooth uniform insulation is obtained.

Moreover, my theory is that the rapid oscillating movement of the die surface 15 relieves the insulation covering 14 of tensile stresses as the conductor and its covering are pulled through the die. By virtue of the fact that the converging surface repeatedly and rapidly strikes against the insulation, a large measure of the force being exerted on the insulation covering is absorbed by the inertia of the insulation material closely adjacent to the bearing region 17. In other words, the effect is localized and avoids tensile stresses on the insulation covering which might tend to open up voids in the portion of the insulation behind the die member. This is entirely different from the relationships involved where the insulation covering on the conductor is dragged through a die without the rapid oscillation therebetween.

In order to reciprocate the die member at high speed, a reciprocating drive system 20 is provided. This drive system includes a movable armature 21 having a recess 22 into which the die member 16 is fitted. As shown in FIGURE 3, a set screw 23 holds the die member in place. The armature is formed of magnetically permeable material such as soft iron and is secured to the center portion of a leaf spring 24 by means of mounting screws 25. An opening 26 in the center of the leaf spring is aligned with the recess 22 in the armature, and the front portion of the die member projects forwardly through this opening in the spring. An axial passageway 27 in the armature accommodates passage of the insulated conductor as it leaves the die member.

The leaf spring is formed of thin spring steel and preferably has an effective stiffness such that the spring resonates with the spring-supported mass at the frequency of operation. This resonance is not necessary but is helpful in reducing the amount of driving power required to reciprocate the armature. At both ends the spring is supported on blocks 29 and held in place by pairs of screws 28 which anchor in the E-shaped magnetic yoke. These blocks and screws may advantageously be formed of magnetically permeable material to reduce further the reluctance of the magnetic circuit between the yoke 30 and spring 24 and armature 21 as will be understood.

As shown, the yoke 30 is formed from a stack of E-shaped laminations and its center leg 31 has an axial passageway 32 to accommodate the insulated conductor. An actuating winding 33 is wound around the center leg 31 in the winding windows 34 defined by the two outer legs 35 of the yoke.

A pair of leads 36 extend from opposite terminals of the winding 33 and are connected to a source 37 of A.C. current of suitable frequency. For example, in this system a 60 cycle source 37 is used so that the armature 21 vibrates at a frequency of 120 cycles per second.

The unfused polytetrafluoroethylene tape 10 described as an illustration of the types of synthetic resin tapes, sometimes called film strips, with which this method and apparatus may be used, can be obtained commercially from Minnesota Mining and Manufacturing Company as "Scotch," "PTF" insulating film type "B" and is described in their sales bulletin No. E–PTF (33.5) LP.

As explained in my prior copending application Serial No. 448,057, filed August 14, 1954, now issued as Patent No. 3,054,710, the unfused polytetrafluoroethylene insulation 14 is fused or sintered into place around the conductor to complete the formation of the insulation sheath around the conductor. It is an advantage of this invention that the voltage breakdown strength of the fused insulation sheath with respect to alternating voltage is markedly increased by compacting the unfused insulation 14 as shown in FIGURES 1 and 2 before the fusing operation takes place.

My theory for explaining this marked improvement is that polytetrafluoroethylene breaks down in the presence of corona discharge. By compacting the insulation covering 14 so as to remove any voids therein, the air spaces are removed and so the formation of corona discharge near the surface of the conductor 12 and within the insulation covering is prevented. When the conductor 12 is stranded, the polytetrafluoroethylene material is driven into the interstices between strands so as to inhibit the formation of corona discharge. This marked improvement in dielectric strength occurs for alternating voltage stresses.

In order to obtain the most benefit from the method and apparatus of the present invention I find that the thickness of the insulation covering 14 should be substantially reduced by the treatment, as indicated in FIG- URES 1 and 2. This substantial compacting of the insulation covering assures that the weak spots are removed. For example, with a single solid conductor 12 I find that greatly improved results are obtained by establishing at least a 20 percent reduction in wall thickness of insulation covering as between the wrapped covering 14 and the compacted covering 40. When the conductor 12 is stranded, then at least 30 percent reduction in wall thickness is preferable.

The unfused polytetrafluoroethylene covering 14 has very limited tensile strength, and it will tear or shred quite easily. The amount of reduction in wall thickness obtained by following this specification is such that the insulation covering 40 will tear, or the conductor 12 will break, or both when attempted without the relative oscillation.

An example of the usual operating range is to use a linear feed of about 20 feet per minute for the conductor and its insulation covering. The die member oscillates at a frequency of 120 cycles per second with an amplitude in the range from 1/16 to 3/16 of an inch. This is an example, and it will be appreciated that for higher feed rates a higher frequency from the source 37 may be used to advantage.

The holes 38 in the ends of the leaf spring 24 may be elongated slightly as shown in FIGURE 2 to accommodate the slight longitudinal movement of the ends as caused by flexing of the leaf spring.

The laminated yoke 30 is 4 inches long as measured along the outside of the legs 35. It is 3¾ inches wide as measured across the back portion 41, and is 1⅛ inches thick. The armature 21 is also laminated and held together by rivets 39. The center leg 31 is approximately 1 inch wide and each of the outer legs 35 are about ½ inch wide. The winding 33 comprises 1035 turns of A.W.G. No. 23 wire insulated with polytetrafluoroethylene. In typical operation the yoke and winding operate at a temperature between 350° F. and 500° F.

In the embodiment of the invention shown in FIGURES 4, 5, and 6, many components correspond with those of FIGURES 1, 2, and 3 and have corresponding reference numbers. The spring support system 50 includes three sets of leaf springs 51, 52, and 53. The two outer sets of leaf springs 51 and 53 have one-half of the width of the center set and are anchored at their centers by the screws 28. At the center of the set of leaf springs 52 is mounted the armature 21 and die member 16 held by the screws 25. Joining the outer ends of these springs are pairs of square rigid bars 54 fastened by rivets 55.

In operation, the bars 54 are free to move slightly to accommodate the change in effective lengths of the springs caused by their flexing. It will be appreciated that the inner springs 52 flex in the opposite direction from the two outer sets 51 and 53.

This spring system 50 is advantageous for use when treating insulation on larger wire sizes, for example, larger than A.W.G. No. 18 because the driving power required to move the die member is substantial. The center set of springs 52 includes eight leafs formed from tempered polished and blued 1095 spring steel with round edges, 0.022 of an inch thick and 1.0 inch wide. Each of the outer spring sets 51 and 53 includes eight leafs of the same specifications as the center ones except that they are 0.5 inch wide.

In the foregoing example the insulation tapes 10 are described as being spirally wrapped about the conductor 12. However, in certain instances it is desirable to apply the insulation tape longitudinally along the wire and to curl the insulation into a sheath about the wire as this avoids the spiral wrapping mechanism. Accordingly, it will be understood that the methods and apparatus of FIGURES 1–6 may be used for compacting an insulation covering wherein the insulation tapes are applied longitudinally along the wire in the manner described hereinafter.

In FIGURES 7, 8 and 9 are shown method and apparatus for compacting an insulation covering of plastic material about an electrical conductor 12 wherein one or more of the insulation tapes are applied longitudinally along the wire. In these figures elements similar to or having functions corresponding with those of elements in FIGURES 1–6 have corresponding reference numbers. For example, three insulation tapes 10 are shown, being supplied from lower, intermediate and upper supply spools 61, 62 and 63, respectively. Each tape is curled about the wire by a die member 16 so that the edges of the tape abut each other to form a sheath of insulation completely surrounding the wire. The successive tapes are fed from respective opposite sides of the conductor 12 so that the lines of abutting of the two edges of each tape in succession are positioned on opposite sides of the conductor for providing a high dielectric strength.

Each spool is carried by a pair of rollers 66 mounted on a support arm 68 extending out from a vertical frame 70. The conductor 12 is supplied from a suitable roll (not shown) and passes around a feed pulley wheel 72, and after the insulation has been applied and compacted to form a covering 74, the insulated wire is led away by a suitable take-up wheel 76.

In order to improve the insulation qualities, so as to increase the dielectric strength and the uniformity of the insulation covering 74, the conductor together with each successive newly applied layer of plastic tape 10 is compacted by the rapidly oscillating converging surface 15 of the die 16. For oscillating each die 16 at ultrasonic frequency, for example such as 20,000 cycles per second, ultrasonic vibrating drive means, generally indicated at 78, are utilized. This ultrasonic drive means includes electromechanical transducer means 80 mounted on the frame 70. The transducer 80 is capable of producing high frequency mechanical vibration when being energized by a high frequency electrical signal. Connected to the transducer means 80 is a rigid bar 82 which serves to transmit the vibrations in an axial direction along its length to its lower end, and a tapered rod 84 serves as a mechanical coupling for transmitting the vibrations with maximum effectiveness to the lower end 86 of this rod.

As shown in FIGURE 9, the rod end 86 is bored and threaded to form a mounting socket 88, and the die 16 is seated in this socket 88. To provide clearance for passage of the insulated wire, there is an axial passageway 90 extending through the drive means 78.

The transducer 80 includes a suitable piezoelectric ceramic material, for example such as lead zirconate titanate, and such transducers are available commercially from Branson Instruments, Inc. of Stamford, Connecticut. To supply high frequency alternating current to the transducer 80, an electrical cable 92 is connected from the transducer to a power supply 94. This power supply is energized from 60 cycle A.C. power mains at 115 volts and includes transistor oscillator circuits which provide ultrasonic frequency electrical power, for example at 20,000 cycles per second and at a peak power output of 152 watts. Such a power supply is available commercially from Branson Instruments, Inc., mentioned above.

Advantageously, the ultrasonic oscillation of the die member 16 in an axial direction appears to reduce the frictional force between the die surface 15 and the insulation tape to a very small value so that the insulation progresses through the converging die surface easily. Consequently, a relatively great compacting action is provided to seal effectively the edges of the tape together and to form a uniform homogeneous insulation sheath without voids therein.

As used herein, "tape" is intended to include a length or a strip of material whether coated with other material, for example such as an adhesive agent, or not. "Conductor" includes wires whether bars or insulated, solid or stranded, and whether of circular or polygonal or of regular or irregular cross sections.

From the foregoing it will be understood that the wire insulating method and apparatus of the present invention described above are well suited to provide the advantages set forth, and since many possible embodiments may be made of the various features of this invention and as the methods and apparatus herein described may be varied in various parts, all without departing from the scope of the invention, it is to be understood that all matter hereinbefore set forth or shown in the accompanying drawing is to be interpreted as illustrative and that in certain instances, some of the features of the invention may be used without a corresponding use of other features, all without departing from the scope of the invention.

What is claimed is:

1. The method of treating a covering of plastic insulation tape surrounding an electrical conductor for purposes of increasing the dielectric strength and uniformity of the insulation tape covering comprising the steps of moving a conductor surrounded by a covering of insulation tape through a converging surface, exerting a squeezing action on the insulation tape by said converging surface, and relatively oscillating said converging surface back and forth with respect to the insulation tape and conductor moving through the converging surface.

2. The method of compacting a covering of plastic insulation tape surrounding an electrical conductor so as to improve the uniformity of the insulation and increase its dielectric strength comprising the steps of continuously passing a conductor surrounded by a covering of insulation tape through converging surfaces engaging the outside of the insulation layer, and oscillating said surfaces at a high rate of speed as the layer of insulation tape passes therethrough, thereby compacting said insulation tape and establishing at least 20 percent reduction in wall thickness of the insulation tape surrounding the conductor.

3. The method of compacting an insulation covering of plastic material onto an electrical conductor for increasing the over-all average insulation strength comprising the steps of threading the conductor and its insulation covering through a die member having an inner converging die surface defining an opening having a minimum cross sectional area less than the cross sectional area of the conductor and its insulation covering, passing said inner converging die surfaces along said insulation covering while reciprocating said die member rapidly longitudinally back and forth with respect to the conductor and its insulation covering.

4. Apparatus for treating plastic insulation covering on conductors comprising a die member having a die opening therethrough defining a die surface converging toward the axis of said opening, a movable mounting for said die member adapted to reciprocate back and forth in a direction parallel with the axis of said die opening, and reciprocating drive mechanism for reciprocating said die member back and forth parallel with said axis.

5. Apparatus for compacting plastic insulation covering on conductors comprising a die member having a die opening therethrough forming a die surface converging toward the axis of said opening, resilient mounting means for said die member arranged to accommodate reciprocating movement of said die member back and forth in a direction parallel with the axis of said die opening, and reciprocating drive means for reciprocating said die member back and forth in said direction.

6. Apparatus for improving the uniformity of the insulation covering on an electrical conductor comprising a magnetically actuable armature, resilient mounting means for said armature adapted to accommodate rapid oscillating movement of said armature back and forth in a direction parallel to a predetermined line, a die member having a die surface thereon converging toward said line, said die member being connected to and driven by said armature, an electromagnetic yoke associated with said armature, and an actuating winding on said yoke.

7. Apparatus for improving the uniformity of the insulation covering on an electrical conductor as claimed in claim 6 and wherein said actuating winding surrounds said line.

8. Apparatus for improving the dielectric strength of the insulation covering on an electrical conductor comprising an E-shaped yoke of magnetically permeable material having an actuating winding surrounding the center leg, said center leg having an axial passageway therethrough, a movable armature near the ends of said legs, a die member carried by said armature having an opening therein aligned with said passageway, said opening defining a die surface converging toward the axis of said passageway, and resilient mounting means for said armature for permitting reciprocating movement parallel with said axis.

9. Apparatus as claimed in claim 8 and wherein said resilient mounting means is a leaf spring spanned across between the ends of the outer legs of said yoke.

10. Apparatus for improving the dielectric strength of the insulation covering on an electrical conductor comprising an E-shaped yoke of magnetically permeable material having an actuating winding surrounding the center leg, said center leg having an axial passageway therethrough for providing clearance for the movement of the conductor therethrough, a movable armature near the end of said center leg, a die member carried by said armature having an opening therein aligned with said passageway, said opening defining a die surface converging toward the axis of said passageway, and resilient mounting means for said armature for permitting reciprocating movement parallel with said axis, said resilient mounting means comprising three parallel leaf springs, said armature being secured to the central region of the middle one of said three parallel leaf springs, and members interconnecting the ends of said leaf springs, the central regions of the outer pair of said three parallel leaf springs being secured to respective outer legs of said yoke.

11. Apparatus as claimed in claim 10 wherein said three parallel leaf springs and said members for interconnecting their ends are of magnetically permeable material.

12. The method of forming an impervious layer of polytetrafluoroethylene on a conductor comprising the steps of applying an unfused tape of polytetrafluoroethylene around the conductor, moving the conductor and said unfused tape through a converging die surface for exerting a squeezing action on said unfused tape, relatively oscillating said die surface longitudinally of the conductor at a high rate of speed, thereby compacting said insulation tape and reducing its thickness by at least 20 percent by the repeated high frequency impacts of said die, and thereafter fusing the compacted insulation tape.

13. The method of compacting an insulation covering as claimed in claim 3 and wherein said die member is reciprocated rapidly longitudinally back and forth with respect to the conductor and its insulation covering with an amplitude in the range from $\frac{1}{16}$ to $\frac{3}{16}$ of an inch.

14. The method of treating a covering of plastic insulation tape surrounding an electrical conductor for purposes of increasing the dielectric strength and uniformity of the insulation tape covering comprising the steps of moving a conductor surrounded by a covering of insulation tape through a converging surface, exerting a squeezing action on the insulation tape by said converging surface, and relatively oscillating said converging surface back and forth at ultrasonic frequency with respect to the insulation tape and conductor moving through the converging surface.

15. The method of compacting an insulation covering of plastic material onto an electrical conductor for increasing the over-all average insulation strength comprising the steps of threading the conductor and its insulation covering through a die member having an inner converging die surface defining an opening having a minimum cross sectional area less than the cross sectional area of the conductor and its insulation covering, passing said inner converging die surfaces along said insulation covering while reciprocating said die member longitudinally back and forth at ultrasonic frequency with respect to the conductor and its insulation covering.

16. Apparatus for improving the uniformity of insulation covering on an electrical conductor comprising ultrasonic transducer means, a source of power for said transducer means, a die member having a converging opening therein connected to said transducer means for being vibrated at ultrasonic frequency, and guide means for guiding the conductor together with its insulation covering through said vibrating die member.

17. Apparatus for improving the uniformity of insulation covering on an electrical conductor comprising an ultrasonic transducer having an axial opening therethrough, a source of power for said transducer, a die member having a converging opening therethrough aligned with the axial opening in said transducer, connection means for connecting said die member to said transducer to be vibrated thereby at ultrasonic frequency, and guide means for guiding the conductor together with its insulation covering through said vibrating die member and through said axial opening in said transducer.

References Cited by the Examiner
UNITED STATES PATENTS

| | | | |
|---|---|---|---|
| 2,389,725 | 11/1945 | Gillis et al. | 156—54 |
| 2,408,627 | 10/1946 | Green | 18—12 |
| 2,565,634 | 8/1951 | Taylor et al. | 156—54 |
| 2,936,483 | 5/1960 | Deakin | 18—12 |
| 3,146,141 | 8/1964 | Woodland | 156—73 |
| 3,222,239 | 12/1965 | Deans | 156—73 X |

EARL M. BERGERT, *Primary Examiner.*

H. ANSHER, *Assistant Examiner.*